Feb. 16, 1937.  E. W. WORK  2,071,152
SPRINGLESS PRESSURE RELIEF VALVE
Filed Dec. 10, 1934
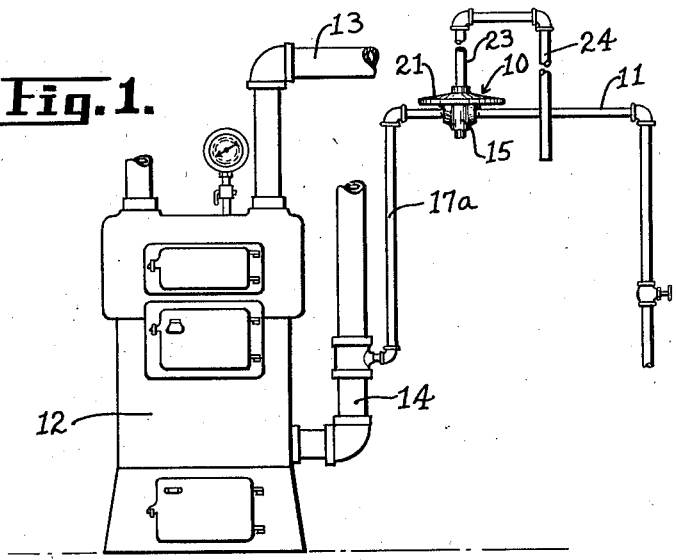
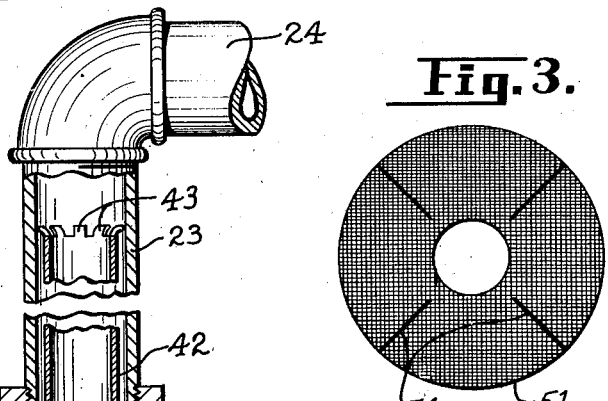
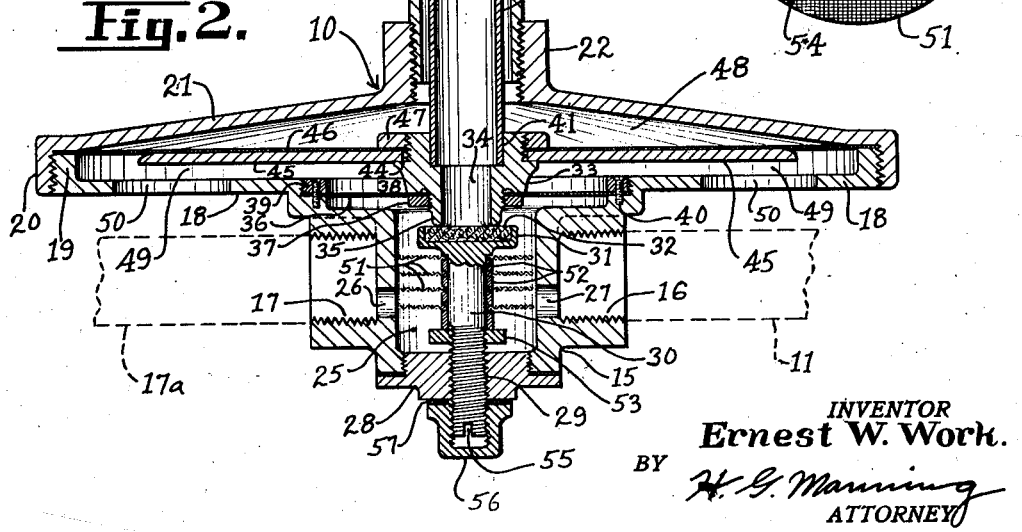
INVENTOR
Ernest W. Work.
BY H. G. Manning
ATTORNEY Patented Feb. 16, 1937

2,071,152

UNITED STATES PATENT OFFICE 2,071,152

SPRINGLESS PRESSURE RELIEF VALVE

Ernest W. Work, Toronto, Ontario, Canada, assignor to The Beaton & Cadwell Manufacturing Company, New Britain, Conn., a corporation of Connecticut Application December 10, 1934, Serial No. 756,850

4 Claims. (Cl. 137—53)

This invention relates to valves, and more particularly to a pressure relief valve for a liquid heating system in which the use of springs and weights are avoided and the opening of the valve is opposed by the pressure of a column of liquid of the same nature as that in the system.

One object of this invention is to provide a pressure relief valve of the above nature for connection with a hot water heating system, and which is adapted to relieve any excess pressure by automatically allowing a small quantity of water to escape when the pressure exceeds a predetermined safe limit.

A further object is to provide a pressure relief valve of the above nature having a casing divided by means of a pair of differential flexible members or diaphragms so arranged that one member is directly responsive to the pressure within the system, while the other member is directly responsive to the pressure of a vertical column of liquid, and so arranged that when the pressure on the first member exceeds the pressure on the second, the valve will automatically open.

A further object is to provide a pressure relief valve of the above nature in which the pressure at which the liquid will be relieved through the valve is governed by the height of the column of liquid resting upon the diaphragm.

A further object is to provide a device of the above nature in which the predetermined point of pressure relief may be varied by increasing or decreasing the height of the liquid column or sizes of the differential diaphragms, the valve being actuated between minimum and maximum limits, and the column of liquid being built up automatically by the escape of liquid until sufficient to close the valve.

A further object is to provide a pressure relief valve of the above nature employing collapsible screens which permit free circulation of liquid through the valve at all times, and which in the event of accumulation of sediment, will yield to the pressure in the system and open up a passage for the escape of the excess liquid.

A further object is to provide a pressure relief valve of the above nature in which the valve seats will be prevented from sticking, vulcanizing, or corroding by the frequent automatic separation of the valve from its seat.

A further object is to provide a pressure relief valve of the above nature in which the valve may be manually raised from its seat at any time without the use of tools or special mechanism.

A further object is to provide a pressure relief valve of the above nature which will operate automatically to replenish any liquid in the water column which may be lost due to evaporation.

A further object is to provide a valve of the above nature which will be comparatively simple in construction, inexpensive to manufacture, easy to install and manipulate, compact, and very efficient and durable in use.

With these and other objects in view there has been illustrated on the accompanying drawing one form in which the invention may be conveniently embodied in practice.

In the drawing:

Fig. 1 represents an elevation view of a conventional closed hot water heating system with the improved pressure relief valve attached to the cold water supply pipe.

Fig. 2 is a vertical sectional view taken through the pressure relief valve.

Fig. 3 is a plan view of one of the collapsible screening discs employed in the valve.

Referring now to the drawing in which like reference numerals denote corresponding parts throughout the several views, the numeral 10 indicates generally the improved pressure relief valve adapted to be installed on a supply pipe 11 leading from the cold water main to a hot water boiler 12, the latter having a riser pipe 13 and a return pipe 14 into which the water supply pipe 11 leads.

As more specifically shown in Fig. 2, the valve unit 10 comprises a body 15 shown as having tapped inlet and outlet openings 16 and 17 connected respectively to the water supply pipe 11 and the pipe 17a leading to the return pipe 14. The upper part of the body member 15 is provided with a relatively large integral circular plate 18 having a raised exteriorly threaded circumferential rim 19 for receiving a depending annular skirt 20 of a conical cover member 21. The apex of the conical cover 21 comprises a cylindrical tapped boss 22 for receiving a water column pipe 23, extending vertically above the valve unit 10 and connected at its upper end to a horizontal overflow drain pipe connection 24.

In order to allow water to freely pass through the body 15 of the valve, provision is made of a cylindrical chamber 25 located between the inlet 16 and outlet 17, said chamber having a pair of small apertures 26 and 27 located in the opposite side walls thereof.

The lower open end of the chamber 25 is adapted to be closed and sealed by means of a threaded plug 28 having a concentric tapped hole 29 for threadedly receiving a vertical valve disc stem 30, axially adjustable with respect to the chamber 25. The upper end of the stem 30 is integrally formed with an enlarged cup section 31 for receiving a flat valve packing disc 32 which is normally adapted to close the lower end of a movable apertured valve member 33. The valve member 33 is provided with a central orifice 34 for allowing the escape of water upwardly therethrough when raised off the disc 32, and the lower end of said member 33 is provided with a depending annular skirt or valve seat 35 for directly contacting with the valve disc 32.

A small flexible diaphragm member 36 which is responsive to the water pressure in the system is connected to the lower end of the valve 33 by means of a nut 37 engaging a threaded portion of the skirt 35. The small diaphragm 36 is adapted to span an enlarged relatively shallow chamber 38 located directly above the valve chamber 25, the outer end of said disc 36 being held securely to the casing 15 by means of a ring member 39 threadedly engaged in said casing and locked in position by screws 40.

As shown in Fig. 2, the upper part of the valve orifice 34 is provided with an enlarged section 41, in which is tightly fitted an elongated interior discharge pipe 42 extending upwardly within the center of the water column pipe 23, and longitudinally movable therein. The upper end of the pipe 42 is provided with a series of spaced guide fingers 43 out-turned in the manner of a spider which engage the inner wall of the water column pipe 23.

It will be understood that it is within the spirit and scope of the present invention to omit the discharge pipe 42, in which case the liquid will be discharged directly into the chamber 48 above the upper diaphragm.

The enlarged upper end of the movable valve member 33 is threaded and provided with an intermediate annular shoulder 44, against which a relatively large plate 45 is adapted to rest for supporting a large flexible diaphragm member 46. The inner end of the large flexible member 46 is tightly clamped upon the plate 45 by means of a nut 47 engaging the upper threaded portion of the member 33, and the outer end of the flexible member 46 is held rigid between the cover 21 and the upper edge of the body rim 19.

It will be noted from this construction that the space included between the cover 21 and the bottom circular plate 18 of the body 15 is divided into two separate compartments by means of the flexible member 46. The upper compartment is indicated by the numeral 48 and is made liquid-tight, while the lower compartment is indicated by the numeral 49 and is adapted to be open to the atmosphere by means of a series of relatively large openings 50 arranged in a circular formation in the intermediate part of the plate 18. The openings 50 are preferably made large enough to permit the insertion of a person's fingers therethrough for manually raising or tilting the supporting plate 45 for the purpose of cleaning and testing the valve.

In order to strain or remove any sediment or other foreign matter from the excess liquid being released from the chamber 25, a series of spaced screening discs 51 (four in this instance) are positioned on the valve stem 30 in spaced relation by means of interposed collars 52 and clamped tightly in position by a nut 53 engaged on the lower threaded portion on the stem 30. The screening discs 51 are made large enough to substantially span the area of the chamber 25, and are provided with a plurality of diametrically opposed radial slits 54, which impart a certain amount of flexibility to the sectors of the screen. By means of this construction, in case the screens should become clogged and a higher pressure is created underneath them, the flexible sectors will yield and permit the liquid to flow upward around the outer edges thereof.

To adjust the position of the flat valve disc 32 in relation to the movable valve seat 35, the lower threaded end of the stem 30 is provided with a kerf 55, in which a screw driver may be inserted for rotating said stem 30 within the tapped plug 28. The lower projecting end of the stem 30 is preferably protected by means of a cap nut 56, the latter engaging a washer 57 which acts as a liquid seal. When the nut 56 is tightly screwed up, it will effectively lock the stem 30 in adjusted position.

*Operation*

In operation, assuming the system to be filled with water under pressure, this pressure will act on the underside of the diaphragm 36, moving it upwardly, separating the valve seat 35 from the packing disc 32. The liquid will then flow up through the orifice 34, filling up the pipe 43, and overflowing into the chamber 48. The diaphragm 46 will thus be covered and the water level will rise in the pipe 23, creating a static downward pressure on the diaphragm 46, said static pressure opposing the upward pressure due to the liquid in the system acting on the diaphragm 36. When the water has attained a level in the pipe 23 high enough to create sufficient static pressure on the diaphragm 48 to overcome the upward pressure acting on the lower surface of the diaphragm 36, the valve will close. No further discharge through the orifice 34 will occur until the pressure in the system increases again, overcoming the static pressure of the liquid column acting on the diaphragm 46. Another discharge of the liquid through the orifice 34 will then occur, raising the level of the liquid in the pipe 23, which in turn increases the static pressure on the diaphragm 46 until this pressure again is great enough to close the valve.

It will be readily seen than any momentary increase of pressure within the system will open the valve and allow just enough liquid to be discharged through the valve to raise the level of the liquid column standing in the pipe 23 to overcome the pressure in the system and close the valve again.

If the level of the column of liquid reaches the height of the overflow pipe 24, no further increase of pressure is possible, since the liquid will then discharge into the drain. The ultimate height of this column of liquid determines the maximum pressure which can be built up in the system.

Should the level of the column of liquid be lowered by evaporation or otherwise, the downward pressure acting on the diaphragm 46 will be reduced until the pressure in the system overcomes it and opens the valve, admitting the water into the pipe 23, until a balance is reached and the valve again closes. This operation, which will occur as long as there is any water pressure in the system, causes an automatic opening and closing of the valve, which will occur frequently enough to prevent any sticking or vulcanizing of the seat to the packing disc 32.

One advantage of the use of the inner pipe 42 is that in case of very sudden operations of the valve, excessive momentary high pressures due to the velocity of the discharging liquid will not be directly imparted to the upper diaphragm, thus protecting the latter from possible injury and preventing rapid closing of the valve.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new and for which it is desired to secure Letters Patent, is:

1. In a pressure relief valve for a liquid system, a casing having a bottom inlet portion adapted for connection to said system, a fixed valve disc in the lower part of said casing, a tubular valve member normally resting on said valve disc for closing said valve, a flexible diaphragm sealed to said movable tubular valve member and to the surrounding casing, said casing having a liquid passage of substantial length extending upwardly therefrom, said passage having a drain outlet connection at its upper end, the liquid in said passage exerting variable downward pressure upon said diaphragm depending on the height of said liquid, the area of said passage being at least as large as said inlet connection.

2. In a pressure relief valve for a liquid system, a casing having a flexible diaphragm dividing it into upper and lower compartments, said lower compartment being adapted for connection to said system, a rigid drain pipe of substantial length extending upwardly from said upper compartment, a fixed valve seat located in the casing in said lower compartment, an apertured movable valve member carried by said diaphragm and normally held in closed position against said valve seat by the pressure to the height of the liquid column in said drain pipe, said movable valve member carrying an upwardly extending tube which is mounted to slide loosely within said rigid drain pipe and which serves to prevent high pressures due to suddenly released liquid from directly impinging upon the upper surface of said diaphragm.

3. In a pressure relief valve for a liquid system, a casing adapted for connection with said system, a horizontal flexible diaphragm dividing said casing into an upper and a lower compartment, said upper compartment having an upwardly extending elongated conduit open to atmosphere for supporting a column of liquid of the same nature as that in the system, a fixed valve seat supported in the bottom part of said casing below said diaphragm, a movable tubular valve member carried by said diaphragm and normally held in closed position upon said fixed valve seat by the pressure due to the height of said column of liquid acting upon said diaphragm, whereby said column of liquid will be automatically built up by the escape of liquid from said system with every increase of pressure above that required to lift said movable valve member from its seat.

4. In a pressure relief valve for a liquid system, a casing having a horizontal flexible diaphragm dividing it into an upper and a lower compartment, said lower compartment being adapted for connection to said system, said upper compartment having an upwardly extending elongated pipe of substantial length, said pipe being open at its top to a drain, a fixed valve seat carried by said casing beneath said diaphragm, a movable tubular valve member carried by said diaphragm and normally held in closed position against said fixed valve seat by the pressure due to the height of the column of liquid in said pipe, whereby said column of liquid will be automatically built up by the escape of liquid from said system with every increase of pressure above that required to lift said movable valve member from its seat until the maximum pressure is reached determined by the height of said pipe.

ERNEST W. WORK.

CERTIFICATE OF CORRECTION.

Patent No. 2,071,152.

February 16, 1937.

ERNEST W. WORK.

It is hereby certified that error appears in the printed specification of the above numbered patent requiring correction as follows: Page 3, first column, line 45, claim 2, after the word "pressure" insert due; and that the said Letters Patent should be read with this correction therein that the same may conform to the record of the case in the Patent Office.

Signed and sealed this 30th day of March, A. D. 1937.

(Seal)

Henry Van Arsdale
Acting Commissioner of Patents.